United States Patent [19]

Poole

[11] 4,136,132

[45] Jan. 23, 1979

[54] MANUFACTURE OF EXTRUDED PRODUCTS

[75] Inventor: Michael J. Poole, London, England

[73] Assignee: BICC Limited, London, England

[21] Appl. No.: 722,545

[22] Filed: Sep. 13, 1976

[30] Foreign Application Priority Data

Sep. 26, 1975 [GB] United Kingdom ............... 39606/75

[51] Int. Cl.$^2$ ........................................... C08F 255/02
[52] U.S. Cl. ................................... 260/827; 264/211; 264/331; 526/22; 526/29
[58] Field of Search .................... 260/827; 526/22, 29; 264/211, 331, 349

[56] References Cited

U.S. PATENT DOCUMENTS

| | | | |
|---|---|---|---|
| 3,121,914 | 2/1964 | Olson | 264/211 |
| 3,646,155 | 2/1972 | Scott | 260/827 |

FOREIGN PATENT DOCUMENTS

| | | |
|---|---|---|
| 964428 | 7/1964 | United Kingdom. |
| 1286460 | 8/1972 | United Kingdom. |
| 1315662 | 5/1973 | United Kingdom. |

*Primary Examiner*—Paul R. Michl
*Attorney, Agent, or Firm*—Buell, Blenko & Ziesenheim

[57] ABSTRACT

In the manufacture of a cross-linked extruded product, a polymer capable of being cross-linked by the use of hydrolyzable unsaturated silane is metered into a first screw extrusion machine together with compounding ingredients comprising a hydrolyzable unsaturated silane, a free-radical generator and a silanol condensation catalyst. The compounding ingredients are mixed with the polymer in the barrel of the first extruder. The mixture of ingredients is fed directly without exposure to the atmosphere to a second screw extrusion machine in which its temperature is raised sufficiently to effect grafting of silane groups to the polymer (the amount of free-radical generator being sufficiently low to limit direct free-radical cross-linking to a level that will not prevent extrusion of the material). The reaction mixture is extruded from the second extruder through an extrusion die to form an elongate shaped product, and the grafted polymer is cross-linked in the shaped product by the action of moisture.

13 Claims, 3 Drawing Figures

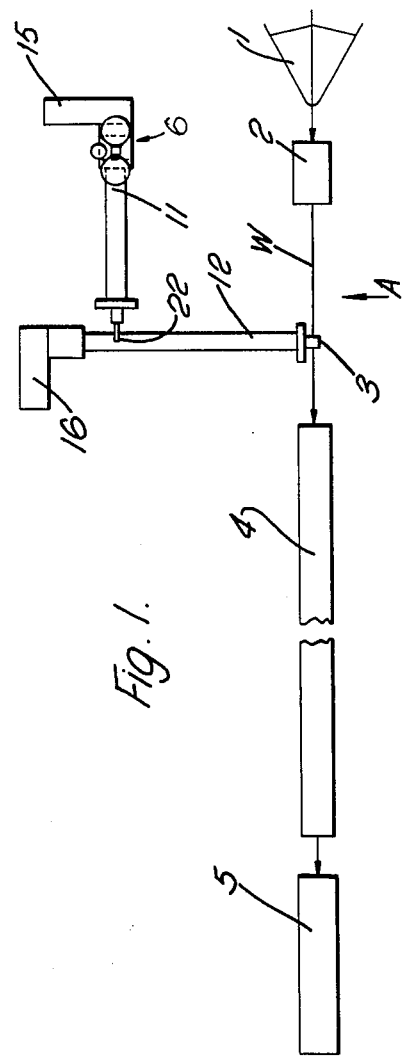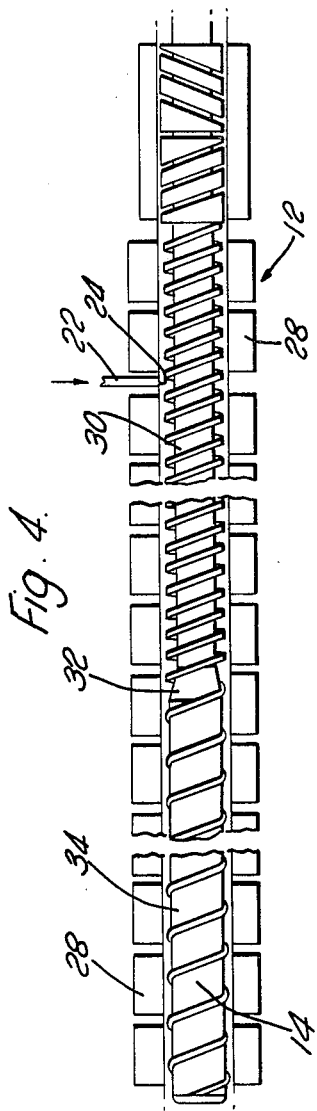

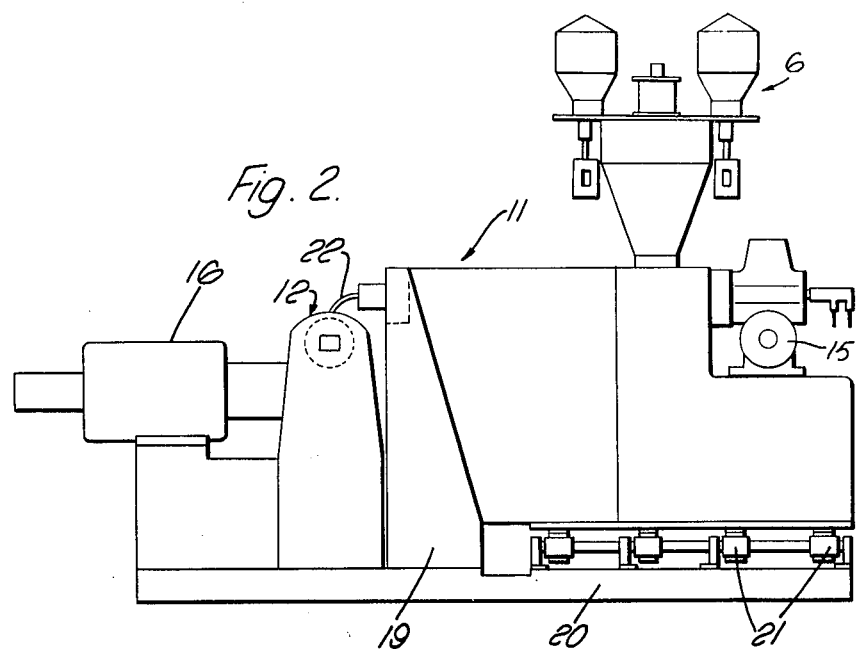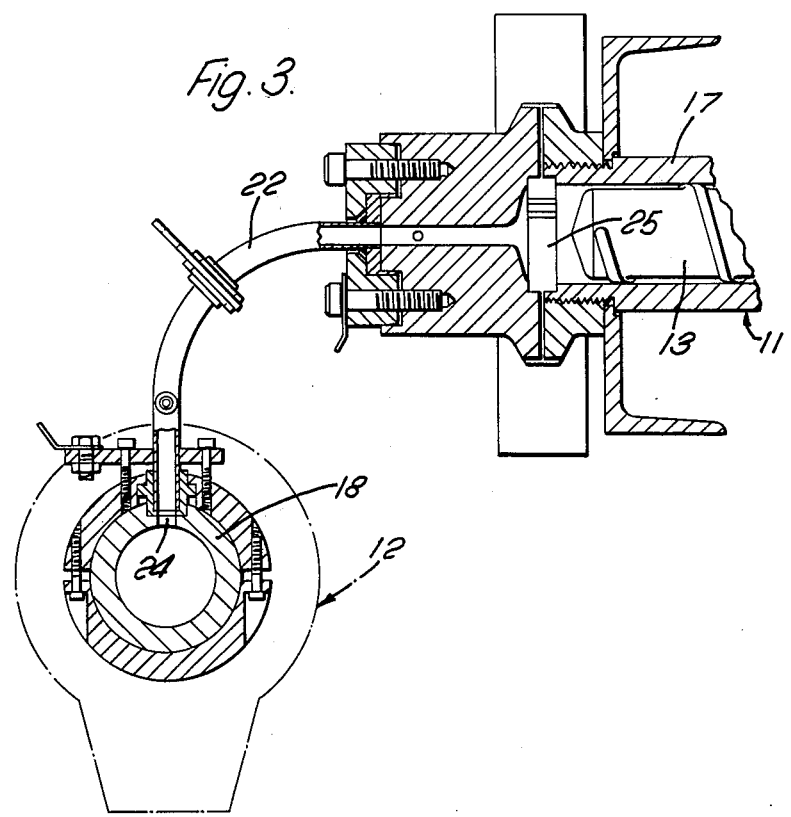

MANUFACTURE OF EXTRUDED PRODUCTS

This invention relates to the manufacture of extruded products, especially but not exclusively electric cables and pipes, that are of carbon-chain polymers cross-linked by first reacting the polymer with a hydrolysable unsaturated silane in the presence of a free-radical generator, such as a peroxide, and afterwards exposing the grafted material to the effects of moisture and silanol condensation catalyst. Suitable reagents have been described in the specification of British Pat. No. 1286460. It is now known, however, that the process is applicable to a variety of polymers other than polyethylene and the modified polyethylenes referred to in that specification, for example chlorinated polyethylenes and a wide range of olefin copolymers can be processed, and in the practice of the present invention the reaction conditions set forth need not in all cases be strictly adhered to.

Originally the manufacture of extruded products by the silane cross-linking technique was a three-stage process: first the grafted polymer was prepared, secondly it was shaped, and thirdly the shaped article was cured. Usually the catalyst was incorporated in the second stage, although it has been suggested that it could be introduced before or during the grafting reaction. However, in copending U.S. patent application Ser. No. 638,448 filed Dec. 8, 1975, Peter Swarbrick et al. have proposed a method of making a cross-linked extruded product which comprises: metering into a screw extrusion machine a polymer capable of being cross-linked by the use of hydrolysable unsaturated silane together with compounding ingredients comprising a hydrolysable unsaturated silane, a free-radical generator and a silanol condensation catalyst; blending the compounding ingredients with the polymer in the barrel of the said extruder and raising the temperature sufficiently to effect grafting of silane groups to the polymer, the amount of free-radical generator being sufficiently low to limit direct free-radical cross-linking to a level that will not prevent extrusion of the material; extruding the reaction mixture from the extruder through an extrusion die to form an elongate shaped product; and cross-linking the grafted polymer in the shaped product by the action of moisture. If required, cross-linking can be effected at a temperature below the softening point of the grafted polymer so as to avoid a risk of distortion.

The present invention relates to a modification of this method which provides additional control facilities.

In accordance with the invention, a method of making a cross-linked extruded product comprises: metering into a first screw extrusion machine a polymer capable of being cross-linked by the use of hydrolysable unsaturated silane together with dry compounding ingredients comprising a hydrolysable unsaturated silane, a free-radical generator and a silanol condensation catalyst; blending the compounding ingredients with the polymer in the barrel of the first extruder; feeding the mixture of ingredients directly without exposure to the atmosphere to a second screw extrusion machine and raising its temperature sufficiently in the barrel of the second extruder to effect grafting of silane groups to the polymer, the amount of free-radical generator being sufficiently low to limit direct free-radical cross-linking to a level that will not prevent extrusion of the material; extruding the reaction mixture from the second extruder through an extrusion die to form an elongate shaped product; and cross-linking the grafted polymer in the shaped product by the action of moisture. The scrupulous exclusion of moisture from the materials fed to the extruder is not required, but, as in conventional extrusion processes, large amounts of water should not normally be present, and in particular cases a specific drying operation may be necessary. If required, cross-linking can be effected at a temperature below the softening point of the grafted polymer so as to avoid a risk of distortion.

The speeds of the two extruder screws may be controlled independently, so providing an additional controlled variable; for example the speed of the first extruder screw may be regulated by a method in accordance with our British Pat. No. 1,315,662.

Other compounding ingredients may be used, for example antioxidants, fillers and pigments, and in most cases these can be mixed with the other ingredients in the first extrusion machine. Some pigments that are difficult to disperse (for example conductive carbon black) may be better pre-compounded with the polymer before it is fed to the first extruder. Use of fillers in the conventional 3-step silane cross-linking process was hampered by the fact that storage stability was often impaired.

For processing of olefin polymers, the preferred compounding ingredients are vinyl tri-methoxy silane, a peroxide that decomposes rapidly at the processing temperature, and dibutyl tin dilaurate, but in suitable circumstances any of the alternative reagents listed in Specification No. 1,286,460 may be used. Preferred peroxides are dicumyl peroxide and 1,3 bis (tert. butyl peroxy iso propyl) benzene (sold under the trademark Perkadox 14).

Preferably the polymer and the compounding ingredients are metered into and premixed in the hopper of the first extruder. Suitable apparatus is commercially available from Colortronic Reinhard & Co. K-G of 6382 Friedrichsdorf/Taunus 2, Otto-Hahnstrasse 18-20, German Federal Republic, and comprises a hopper with a central powered screw mixer and up to four digitally controlled metering devices; for metering solid materials a rotor having a series of metering chambers filled from above and discharging downwards at a separate station is controlled to rotate, usually discontinuously, at the required rate, whereas for liquids an adjustable diaphragm metering pump is used.

If the number of compounding ingredients required makes it necessary, or if desired, suitable combinations may be pre-mixed and metered as a mixture; for example the condensation catalyst may usually be dissolved in a liquid silane and metered as a solution.

The barrels of the two extruders may be integrally connected provided that they have separate screws, not directly mechanically coupled to each other, that act in series with one another.

The first extruder will ordinarily need to provide a premixing zone and a homogenising zone. Preferably the homogenising zone is of the kind, described and claimed in Maillefer S.A.'s British Pat. No. 964,428, in which the material to be extruded is forced over the flight of the extruder screw from a converging groove to a diverging groove, one advantage of this arrangement being that entrainment of insufficiently-softened particulate material is inhibited. The second extruder will ordinarily need to provide a reaction zone and a metering zone.

From the metering zone of the extruder of homogenised and grafted mixture passes to the extrusion die, which will normally be mounted in a cross-head in the case of cable manufacture. The extruded product may be cooled in water in the usual way, preferably using graded temperatures in the cooling trough in the manner known for ordinary polyethylene. The finished product can be cross-linked by exposure to water or a moist atmosphere at a suitable temperature, as in the known three-stage silane grafting technique.

The method of the invention avoids the need for two high-temperature processing steps and for storing moisture-sensitive intermediates such as grafted polymer, whilst retaining the advantage of the silane grafting technique that the extruded product can be cooled and examined in a very short period compared with vulcanising and chemical cross-linking methods that involve high-temperature treatment of the extruded product to effect cross-linking.

The invention will be further illustrated by a description by way of example and with reference to the accompanying drawings in which:

FIG. 1 is a diagrammatic plan view of the layout of plant comprising two extruders arranged for use in the method of the present invention, FIG. 2 is a diagrammatic side elevation of the two extruders looking in the direction of arrow A in FIG. 1, FIG. 3 is an enlarged section illustrating the interconnection between the barrels of the two extruders, and FIG. 4 is a diagrammatic fragmental side view partly in section and partly in elevation of the barrel and screw of the second extruder.

The plant (FIG. 1) comprises a pay off unit 1 from which wire W is drawn, if desired, through a wire-preheating device 2, into the cross-head die 3 of the second of two screw extrusion machines 11 and 12, arranged in series, where a layer of cross-linkable material is applied to the wire. The covered wire passes through a cooling trough 4 or other cooling device to a take-up 6 where it is wound on a reel or coiled in a container.

The two screw extrusion machines 11 and 12 are independently driven by drive units 15 and 16; drive unit 15 is controlled in the manner described in the Specification of British Pat. No. 1,315,662. The first machine 11 (referring now to FIG. 2) has a screw 13 with an L/D ratio (where L is the length of the screw and D is the external diameter of the screw thread) of 20:1; this extruder is fitted with a metering device 6 which feeds to it the polymer and the compounding ingredients, which are softened and uniformly mixed in the extruder 11 and then fed at a controlled temperature to the second extruder 12.

Expansion of the barrel 17 of the first machine 11 under thermal expansion is accommodated by allowing for displacement of the inlet end thereof with respect to the second machine 12. As will be seen on referring to FIG. 2 accommodation for such displacement is accomplished by rigidly fixing the outlet end of the barrel 17, by means of an anchor bracket 19, to a stationary base plate 20 for both machines, and allowing the body of the machine 11 to move on sliding bearings 21 in a direction away from the anchor bracket.

At the outlet of the first extruder 11 the blended material passes through a breaker plate 25 (FIG. 3) and sieve packs (not shown). It then passes via a short curved feed pipe 22 into the barrel 18 of the second extruder 12 through an inlet 24. The feed pipe 22 is long enough to give it sufficient flexibility to allow for the small transverse expansion of the barrel 18 of the second extruder 12 and axial expansion of the part of the first machine 11 between the anchor bracket 19 and the barrel 18 of the second machine but is not long enough to cause undue pressure build up in the first machine.

The screw 14 of the second extruder 12 (FIG. 4) is surrounded by heater zones 28, and comprises a feed section 30, a short compression section 32, and a metering section 34. The feed pipe 22 discharges at a port 24 part way along the feed section 30.

EXAMPLE (All parts in the example are by weight.)

100 parts of a low-density polyethylene (sold by Imperial Chemical Industries Limited under the trademark "Alkathene" as Alkathene XNM68) was tumbled in a commercially available "Rotocube" (trade mark) mixer with 0.5 parts polymerised dimethyl hydroquinoline (sold under the trade mark "Flectol H".) A homogeneous solution comprising 2.5 parts of vinyl trimethoxysilane, 0.265 parts dicumyl peroxide (sold under the trademark "Dicup R") and 0.05 parts dibutyl tin dilaurate was added and tumbling continued for a further 20 minutes.

The resulting pre-mix of ingredients was then fed to and extruded by plant exactly as just described, except that the metering unit 6 was omitted, to insulate a copper wire 1.2mm in diameter to a nominal radial thickness of 1.0mm. The temperature of the first extruder was maintained at 130° C. (too low to produce significant grafting), the connecting pipe at 140° C. and the temperature rising gradually in the second or main extruder to reach 230° C. at the final zone of the screw and in the cross-head.

After cooling in the water trough in the usual way, the insulated wire was boiled in water for two hours to effect cross-linking. The gel content of the material was then about 76% and the following physical properties were measured for two samples (prepared with the second extruder running at different speeds):

Tensile Strength: 15.6 MN/m$^2$, 13.2 MN/m$^2$
Yield Strength: 11.2 MN/m$^2$, 10.6 MN/m$^2$
Elongation at Break: 320%, 310%.

The compounding recipes given in the Examples of the main application can be used in the method of this application.

What I claim as my invention is:

1. A method of making a cross-linked extruded product comprising: metering into a first screw extrusion machine a polymer capable of being cross-linked by the use of hydrolysable unsaturated silane together with compounding ingredients comprising a hydrolysable unsaturated silane, a free-radical generator and a silanol condensation catalyst; blending said compounding ingredients with said polymer in the barrel of said first extruder to form a homogeneous mixture at a temperature low enough to avoid substantial grafting of silane groups to the polymer; feeding said mixture directly without exposure to the atmosphere to a second screw extrusion machine and raising its temperature sufficiently in said second extrusion machine to effect grafting of silane groups to the polymer, the amount of free-radical generator being sufficiently low to limit direct free-radical cross-linking to a level compatible with extrusion of the material; after said grafting extruding said mixture from said second extruder through an extrusion die to form an elongate shaped product; and cross-linking said polymer in said shaped product by the action of moisture.

2. A method as claimed in claim 1 in which the screws of the first and second extrusion machines are independently controlled.

3. A method as claimed in claim 1 in which the cross-linking is effected at a temperature below the softening point of said shaped product.

4. A method as claimed in claim 1 in which said polymer and at least one said compounding ingredient are metered into and premixed in a hopper at the inlet of the first extruder.

5. A method as claimed in claim 1 in which at least one said compounding ingredient is metered as a component of a mixture.

6. A method as claimed in claim 1 in which said free-radical generator is a peroxide which is metered as a masterbatch with the polymer.

7. A method as claimed in claim 1 in which said free-radical generator is a peroxide which is metered as a coating on particles of polymer or filler.

8. A method as claimed in claim 1 in which a filler is metered as a predispersed mixture with at least part of said polymer.

9. A method as claimed in claim 1 in which said condensation catalyst is metered as a solution in a liquid silane.

10. A method as claimed in any one of the preceding claims in which at least one said compounding ingredient is a liquid and is injected to the base of a hopper at the inlet of said first extruder.

11. A method as claimed in claim 1 in which the polymer is polyethylene and the compounding ingredients comprise vinyl trimethoxy silane, a peroxide, and dibutyltin dilaurate.

12. A method as claimed in claim 11 in which the peroxide is dicumyl peroxide.

13. A method as claimed in claim 11 in which the peroxide is 1,3 bis (tert-butyl peroxy iso propyl) benzene.

* * * * *